(12) United States Patent
Rogers

(10) Patent No.: US 11,058,266 B1
(45) Date of Patent: Jul. 13, 2021

(54) FOLDABLE PORTABLE TOILET ASSEMBLY

(71) Applicant: Antoine Rogers, Brooklyn, NY (US)

(72) Inventor: Antoine Rogers, Brooklyn, NY (US)

( * ) Notice: Subject to any disclaimer, the term of this patent is extended or adjusted under 35 U.S.C. 154(b) by 0 days.

(21) Appl. No.: 16/738,363

(22) Filed: Jan. 9, 2020

(51) Int. Cl.
*A47K 13/00* (2006.01)
*A47K 11/06* (2006.01)
*A47K 11/02* (2006.01)

(52) U.S. Cl.
CPC ............ *A47K 13/005* (2013.01); *A47K 11/02* (2013.01); *A47K 11/06* (2013.01)

(58) Field of Classification Search
CPC ....... A47K 11/02; A47K 13/005; A47K 11/06
See application file for complete search history.

(56) References Cited

U.S. PATENT DOCUMENTS

| | | | |
|---|---|---|---|
| 2,801,426 A | 8/1957 | La Gorce | |
| 2,849,726 A * | 9/1958 | Vay | A47K 11/02 4/476 |
| 3,063,061 A | 11/1962 | Bertram | |
| 3,579,655 A * | 5/1971 | Sundberg | A47K 11/02 4/476 |
| 5,187,819 A * | 2/1993 | Grimes | A47K 11/06 4/483 |
| 5,682,623 A | 11/1997 | Fenoglio | |
| D520,616 S | 5/2006 | Sharp | |
| 9,993,123 B2 | 6/2018 | Moise | |
| 10,080,440 B2 | 9/2018 | Nelson | |
| 2004/0060105 A1 | 4/2004 | Hickey | |
| 2009/0165199 A1* | 7/2009 | Heumann | A47K 11/02 4/483 |
| 2011/0052838 A1* | 3/2011 | Levkovitch | A47K 11/06 428/12 |

* cited by examiner

*Primary Examiner* — Janie M Loeppke

(57) ABSTRACT

A foldable portable toilet assembly for facilitating toiletry in a remote location includes a series of panels that is bendably coupled together. The series of panels defines a triangular shape when the series of panels is in a deployed position. In this way the series of panels can be stood on a support surface. A toilet seat is hingedly coupled to the series of panels and the toilet seat is positionable in a lowered position when the series of panels is positioned in the deployed position. Thus, the toilet seat can be sat upon by a user. A bag is positionable beneath the toilet seat when the series of panels is positioned in the deployed position to capture waste from the user.

7 Claims, 5 Drawing Sheets

FIG. 5

FOLDABLE PORTABLE TOILET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to portable toilet devices and more particularly pertains to a new portable toilet device for facilitating toiletry in a remote location.

(2) Description of Related Art Including Information Disclosed Under 37 CFR 1.97 and 1.98

The prior art relates to portable toilet devices. The prior art discloses a variety of portable toilets that include a collapsible frame, a seat and a bag for collecting waste. The prior art discloses a portable toilet that includes a series of panels that can be deployed to form a cube for sitting upon. Additionally, the prior art discloses a tent that is deployable for housing a cubic portable toilet. The prior art discloses a portable toilet that includes a seat and a plurality of telescopic legs extending downwardly from the seat. The prior art additionally discloses a toilet seat with a pair of panels that are hingedly coupled thereto that form legs when the panels are in a deployed position.

BRIEF SUMMARY OF THE INVENTION

An embodiment of the disclosure meets the needs presented above by generally comprising a series of panels that is bendably coupled together. The series of panels defines a triangular shape when the series of panels is in a deployed position. In this way the series of panels can be stood on a support surface. A toilet seat is hingedly coupled to the series of panels and the toilet seat is positionable in a lowered position when the series of panels is positioned in the deployed position. Thus, the toilet seat can be sat upon by a user. A bag is positionable beneath the toilet seat when the series of panels is positioned in the deployed position to capture waste from the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
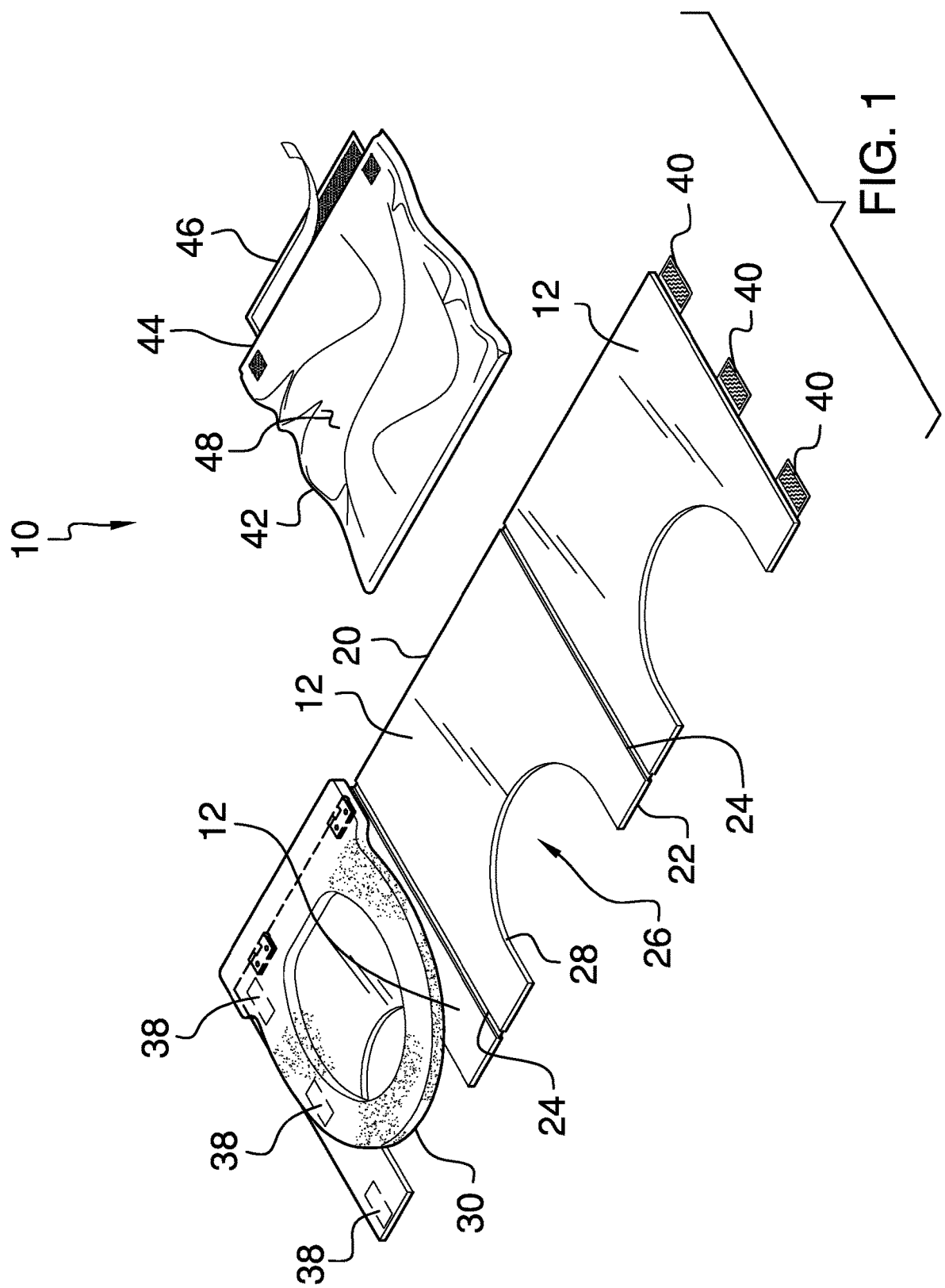
FIG. 1 is a top perspective view of a foldable portable toilet assembly according to an embodiment of the disclosure.
Figure 2:
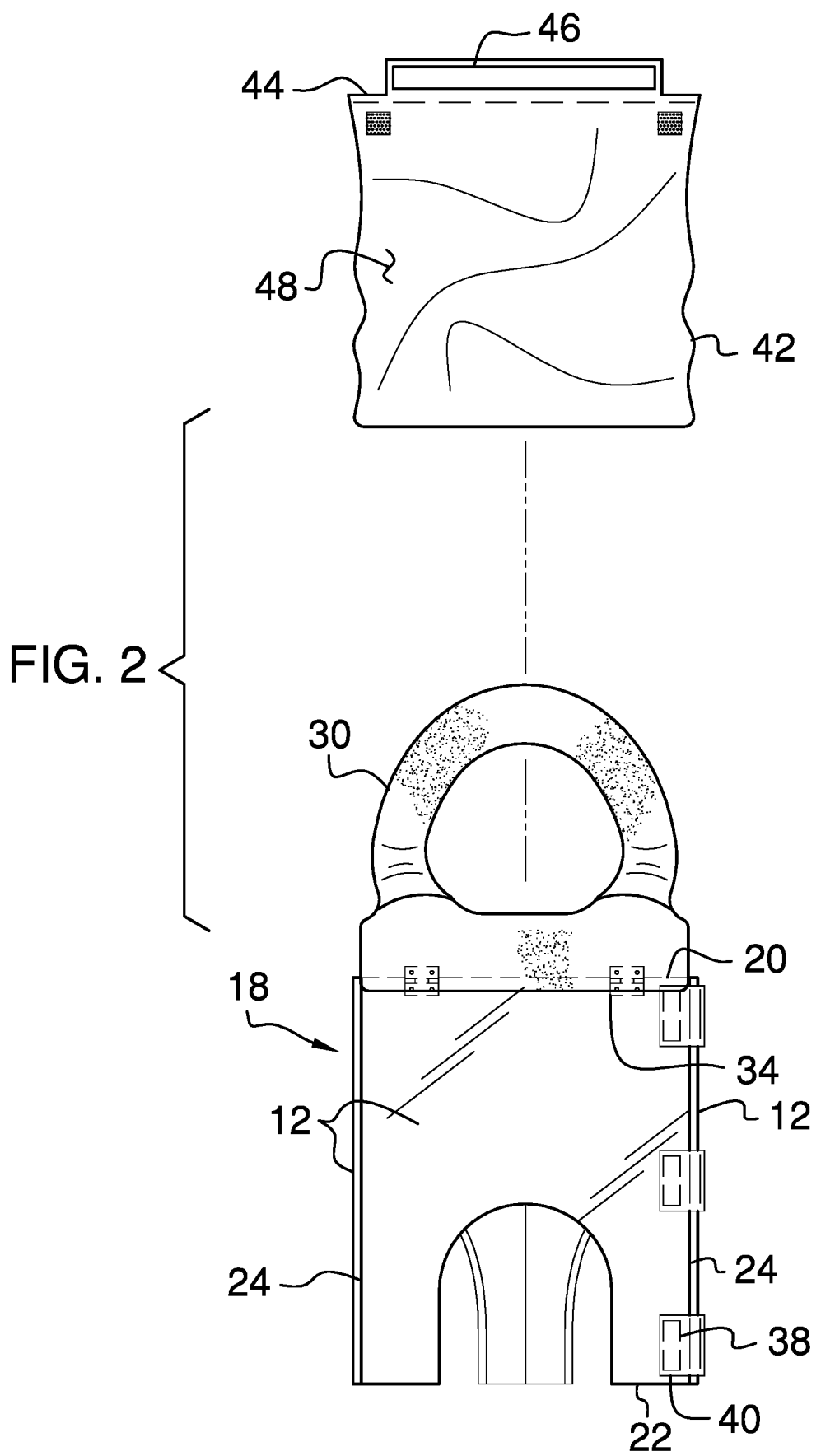
FIG. 2 is a back view of an embodiment of the disclosure showing a series of panels in a deployed position.
Figure 3:
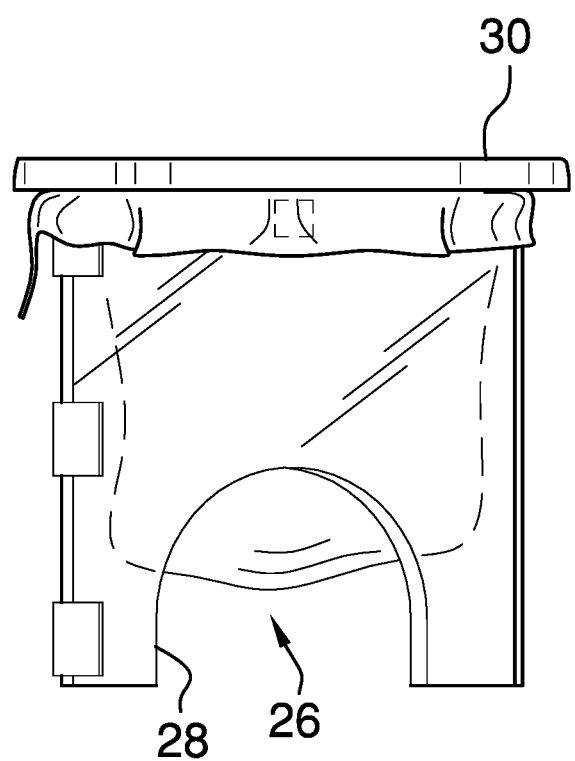
FIG. 3 is a back phantom view of an embodiment of the disclosure showing a toilet seat in a lowered position.
Figure 4:
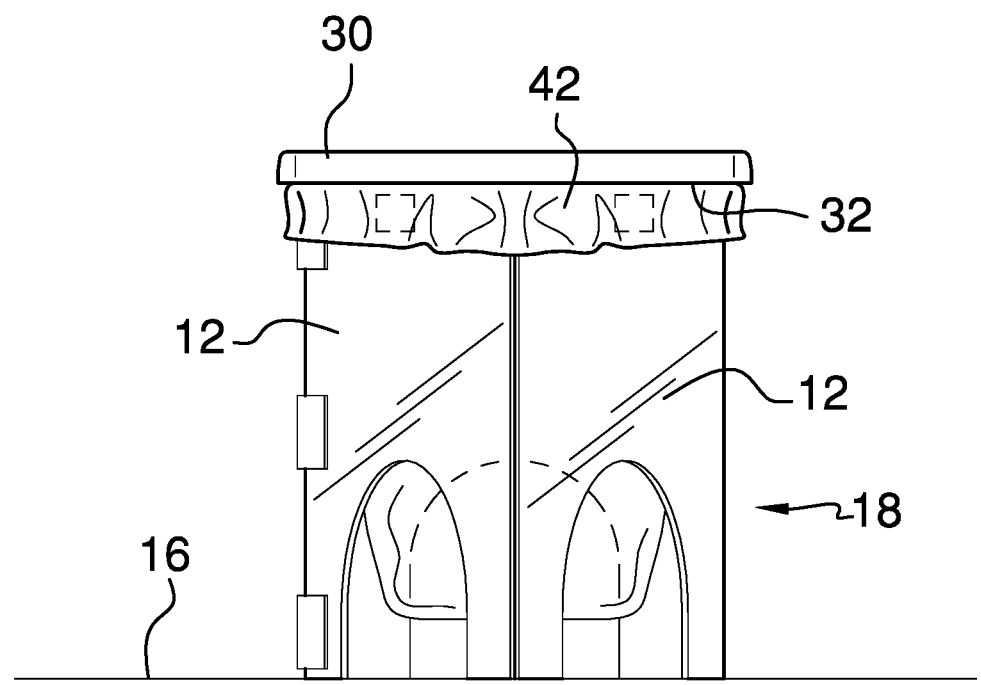
FIG. 4 is a front view of an embodiment of the disclosure showing a series of panels in a deployed position and a toilet seat in a lowered position.
Figure 5:
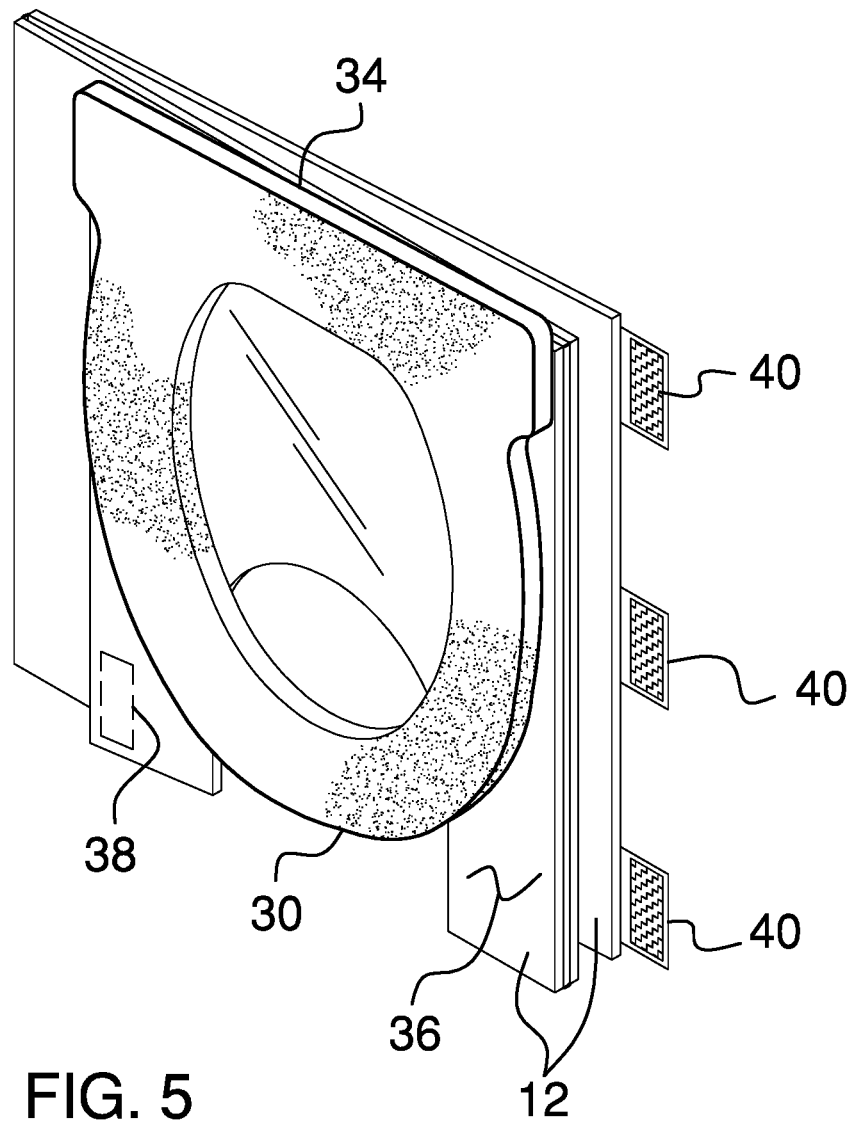
FIG. 5 is a perspective view of an embodiment of the disclosure showing a series of panels in a folded position.

With reference now to the drawings, and in particular to FIGS. 1 through 5 thereof, a new portable toilet device embodying the principles and concepts of an embodiment of the disclosure and generally designated by the reference numeral 10 will be described.

As best illustrated in FIGS. 1 through 5, the foldable portable toilet assembly 10 generally comprises a series of panels 12 is bendably coupled together such that the series of panels 12 is positionable in deployed position and a folded position. The series of panels 12 defines a triangular shape when the series of panels 12 is in the deployed position. In this way the series of panels 12 can be stood on a support surface 16 to define a base of a toilet 18. The series of panels 12 lie flat on each other when the series of panels 12 is in the folded position thereby facilitating easy transport in a vehicle or the like.

The series of panels 12 each has a top edge 20, a bottom edge 22 and a pair of lateral edges 24. Respective lateral edges 24 of the series of panels 12 are foldably coupled together such that the series of panels 12 is distributed along an axis extending through the lateral edges 24. The bottom edge 22 of each of the series of panels 12 has a cut out 26 extending toward the top edge 20. The cut out 26 has a bounding edge 28 and the bounding edge 28 is concavely arcuate with respect to the bottom edge 22.

A toilet seat 30 is provided and the toilet seat 30 is hingedly coupled to the series of panels 12. The toilet seat 30 is positionable in a lowered position when the series of panels 12 is positioned in the deployed position. In this way a user can sit on the toilet seat 30 for defecation or urination. The toilet seat 30 has a bottom surface 32 and a rear edge 34, and the rear edge 34 is hingedly coupled to the top edge 20 of a respective one of the series of panels 12. The bottom surface 32 rests on the top edge 20 of each of the series of panels 12 when the toilet seat 30 is in the lowered position and the series of panels 12 is in the deployed position. Conversely, the bottom surface 32 rests against a first surface 36 of the respective series of panels 12 when the series of panels 12 is in the folded position.

A plurality of first mating members 38 is each coupled to a second surface of a respective one of the series of panels 12. The first mating members 38 are aligned with a respective lateral edge 24 of the respective series of panels 12. A plurality of second mating members 40 is each coupled to a respective lateral edge of a respective one of the series of panels 12. Each of the second mating members 40 is aligned with a respective one of the first mating members 38 when the series of panels 12 is positioned in the deployed position. Additionally, each of the second mating members 40 releasably engages the respective first mating member 38 for retaining the series of panels 12 in the deployed position. Each of the first mating members 38 and the second mating members 40 may comprise hook and loop fasteners or other type of releasable fastener.

A bag 42 is provided and the bag 42 is positionable beneath the toilet seat 30 when the series of panels 12 is positioned in the deployed position. In this way the bag 42 can capture waste from the user. The bag 42 is comprised of a fluid impermeable material for containing the user's waste. The bag 42 is extendable downwardly into the base of the toilet 18 defined by the series of panels 12 when the series of panels 12 is in the deployed position.

The bag 42 is wrappable downwardly over the top edge 20 of the series of panels 12 such that the bottom surface 32 of the toilet rests on the bag 42. In this way the bag 42 is inhibited from falling off of the series of panels 12. The bag 42 has a top end 44, a flap 46 that is aligned with the top end 44 and an outer surface 48. The top end 44 is open and the flap 46 is foldable over the top end 44 for closing the bag 42. The flap 46 is matable to the outer surface 48 of the bag 42 when the flap 46 is folded over the top end 44 for retaining the flap 46 over the top end 44. The bag 42 may include hook and loop fasteners positioned on the flap 46 and the outer surface 48 of the bag 42.

In use, the series of panels 12 is positioned in the deployed position and each of the first mating members 38 is engaged to the respective second mating member 40. The series of panels 12 is stood on the support surface 16 and the bag 42 is positioned on the series of panels 12. The toilet seat 30 is positioned in the lowered position and the user sits on the toilet seat 30 for defecation or urination. In this way the user can enjoy the comfort of a toilet in a remote location where a bathroom is not available. Additionally, the bag 42 captures and contains the user's waste for subsequent disposal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable portable toilet assembly being configured to be deployed in a remote location for toiletry purposes, said assembly comprising:
   a series of panels being bendably coupled together such that said series of panels is positionable in deployed position and a folded position, said series of panels defining a triangular shape when said series of panels is in said deployed position thereby facilitating said series of panels to be stood on a support surface wherein said series of panels is configured to define the base of a toilet, said series of panels lying flat on each other when said series of panels is in said folded position, wherein said series of panels has a top edge, a bottom edge and a pair of lateral edges, respective lateral edges of said series of panels being foldably coupled together such that said series of panels is distributed along an axis extending through said lateral edges;
   a toilet seat being hingedly coupled to said series of panels, said toilet seat being positionable in a lowered position when said series of panels is positioned in said deployed position wherein said toilet seat is configured to be sat upon by a user, wherein said toilet seat has a bottom surface and a rear edge, said rear edge being hingedly coupled to said top edge of a respective one of said series of panels, said bottom surface resting on said top edge of each of said series of panels when said toilet seat is in said lowered position and said series of panels is in said deployed position, said bottom surface resting against a first surface of said respective series of panels when said series of panels is in said folded position, wherein said rear edge of said toilet seat is straight, said toilet seat having a peripheral edge extending outwardly from said rear edge, said peripheral edge having opposite ends each being inwardly spaced from a respective end of said rear edge, said peripheral edge extending away from said rear edge and curving to form an arcuate ovoid shape bowing out in a middle portion and curving back inwardly such that said top edges of said panels extend across said bottom surface of said toilet seat when said toilet seat is in said lowered position; and
   a bag being positionable beneath said toilet seat when said series of panels is positioned in said deployed position wherein said bag is configured to capture waste from the user, said bag being comprised of a fluid impermeable material wherein said bag is configured to contain the user's waste, said bag being extendable downwardly into the base of the toilet defined by said series of panels when said series of panels is in said deployed position.

2. The assembly according to claim 1, wherein said bottom edge of each of said series of panels has a cut out extending toward said top edge, said cut out having a bounding edge, said bounding edge being concavely arcuate with respect to said bottom edge.

3. The assembly according to claim 1, further comprising a plurality of first mating members, each of said first mating members being coupled to a second surface of a respective one of said series of panels, said first mating members being aligned with a respective lateral edge of said respective series of panels.

4. The assembly according to claim 3, further comprising a plurality of second mating members, each of said second mating members being coupled to a respective lateral edge of a respective one of said series of panels, each of said second mating members being aligned with a respective one of said first mating members when said series of panels is positioned in said deployed position, each of said second mating members releasably engaging said respective first mating member for retaining said series of panels in said deployed position.

5. The assembly according to claim 1, wherein said bag is wrappable downwardly over said top edge of said series of panels such that said bottom surface of said toilet rests on said bag thereby inhibiting said bag from falling off of said series of panels.

6. The assembly according to claim 5, wherein said bag has a top end, a flap being aligned with said top end and an outer surface, said top end being open, said flap being foldable over said top end for closing said bag, said flap being matable to said outer surface of said bag when said flap is folded over said top end for retaining said flap over said top end.

7. A foldable portable toilet assembly being configured to be deployed in a remote location for toiletry purposes, said assembly comprising:
- a series of panels being bendably coupled together such that said series of panels is positionable in deployed position and a folded position, said series of panels defining a triangular shape when said series of panels is in said deployed position thereby facilitating said series of panels to be stood on a support surface wherein said series of panels is configured to define the base of a toilet, said series of panels having a top edge, a bottom edge and a pair of lateral edges, respective lateral edges of said series of panels being foldably coupled together such that said series of panels is distributed along an axis extending through said lateral edges, said bottom edge of each of said series of panels having a cut out extending toward said top edge, said cut out having a bounding edge, said bounding edge being concavely arcuate with respect to said bottom edge, said series of panels lying flat on each other when said series of panels is in said folded position;
- a toilet seat being hingedly coupled to said series of panels, said toilet seat being positionable in a lowered position when said series of panels is positioned in said deployed position wherein said toilet seat is configured to be sat upon by a user, said toilet seat having a bottom surface and a rear edge, said rear edge being hingedly coupled to said top edge of a respective one of said series of panels, said bottom surface resting on said top edge of each of said series of panels when said toilet seat is in said lowered position and said series of panels is in said deployed position, said bottom surface resting against a first surface of said respective series of panels when said series of panels is in said folded position, wherein said rear edge of said toilet seat is straight, said toilet seat having a peripheral edge extending outwardly from said rear edge, said peripheral edge having opposite ends each being inwardly spaced from a respective end of said rear edge, said peripheral edge extending away from said rear edge and curving to form an arcuate ovoid shape bowing out in a middle portion and curving back inwardly such that said top edges of said panels extend across said bottom surface of said toilet seat when said toilet seat is in said lowered position;
- a plurality of first mating members, each of said first mating members being coupled to a second surface of a respective one of said series of panels, said first mating members being aligned with a respective lateral edge of said respective series of panels;
- a plurality of second mating members, each of said second mating members being coupled to a respective lateral edge of a respective one of said series of panels, each of said second mating members being aligned with a respective one of said first mating members when said series of panels is positioned in said deployed position, each of said second mating members releasably engaging said respective first mating member for retaining said series of panels in said deployed position; and
- a bag being positionable beneath said toilet seat when said series of panels is positioned in said deployed position wherein said bag is configured to capture waste from the user, said bag being comprised of a fluid impermeable material wherein said bag is configured to contain the user's waste, said bag being extendable downwardly into the base of the toilet defined by said series of panels when said series of panels is in said deployed position, said bag being wrappable downwardly over said top edge of said series of panels such that said bottom surface of said toilet rests on said bag thereby inhibiting said bag from falling off of said series of panels, said bag having a top end, a flap being aligned with said top end and an outer surface, said top end being open, said flap being foldable over said top end for closing said bag, said flap being matable to said outer surface of said bag when said flap is folded over said top end for retaining said flap over said top end.

\* \* \* \* \*